No. 3,437. REISSUED MAY 18, 1869.
A. ARNOLD.
TEA AND COFFEE POT.
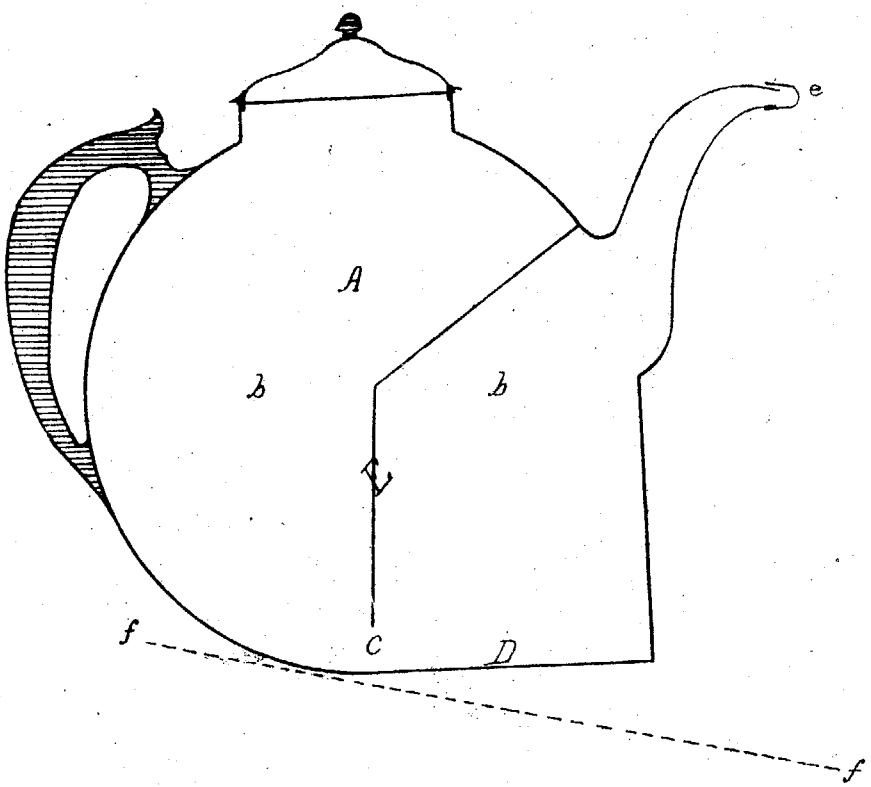
Witnesses
Henry Stanton
Joseph Smith
Alfred Arnold.
THE NORRIS PETERS CO., WASHINGTON, D. C.

UNITED STATES PATENT OFFICE.

ALFRED ARNOLD, OF TENAFLY, NEW JERSEY.

*Letters Patent No.* 71,837, *dated December* 10, 1867; *reissue No.* 3,437, *dated May* 18, 1869.

TEA AND COFFEE-POT.

The Schedule referred to in these Letters Patent and making part of the same.

*To all whom it may concern:*

Be it known that I, ALFRED ARNOLD, of Tenafly, county of Bergen, and State of New Jersey, have invented a new and useful Improvement in Tea and Coffee-Pot, or Boilers, of which the following is a full and exact description, reference being had to the accompanying drawing, and letters of reference marked thereon.

Excessive boiling of tea or coffee makes a thick unpalatable decoction.

Steam or vapor escaping from the boiler carries with it the aroma of the beverage.

Decocters, boiled by the flame of a lamp, have been provided with automatic mechanism, which, actuated by the steam within them, either extinguishes the flame or removes the lamp, and thus prevents both excessive boiling and the escape of steam or vapor. But as the heat of a stove cannot be thus extinguished or removed, no mode, previous to my invention, was known for automatically preventing excessive boiling in decocters which receive their heat therefrom; and the only mode known or used to prevent the escape of steam was the employment of cold water surface-condensers.

The object of my invention is to prevent, automatically, both excessive boiling and the escape of steam in such tea and coffee-boilers as receive their heat from the hot surface of a range or stove.

My invention consists—

First, in providing a decocter (so made and arranged as to oscillate by changes in the centre of gravity of its contents) with a suitable heating-surface, arranged to adjust itself to the hot surface of the stove, receive its heat, and then recede therefrom.

Second, in a general arrangement of parts in said boiler, which I prefer, for carrying the gist of my invention into operation.

The drawing is a vertical section of my improved pot, or boiler.

The boiler, which is composed of two distinct chambers, communicating with each other at their bottoms, may be made of any suitable form, but I prefer the arrangement shown, in which the vessel A contains two chambers, or compartments *b b'*, separated by the partition E.

D is the heating-surface, arranged relative to the other parts so as to come in contact on a plane with the surface of the stove.

C is the support, on which the boiler oscillates. Its requirements are to admit D to adjust itself to the surface of the stove, and to conduct but little heat to the contents of the boiler.

Any other arrangement than that shown, which will fulfil said requirements, may, if preferred, be employed.

In its operation, the boiler, with its contents, is placed on the hot range or stove, the spout is then closed by the thimble *e*, and when the water boils in *b*, it is forced by the steam into *b'*, the centre of gravity recedes from D towards *b'*, until D rises from the stove, (as shown by dotted line,) and boiling ceases. Then, should the steam in *b* condense, water returns from *b'* to *b*, until D resumes contact with the surface of the stove.

Any or all of the parts shown may be modified or changed in any way compatible with their several requirements for carrying the gist of my invention (as it is herein set forth) into practical operation.

What I claim as my invention, is—

1. In combination with *b b'*, or their equivalents, the heating-surface D, when so arranged that it will come in contact with the hot surface of the stove, receive its heat, and then recede therefrom, substantially as is herein set forth.

2. Arranging C, or other support, on which the boiler oscillates, so that the plane of D will conform to that of the stove when in contact.

3. The combination of *b b'*, D, and E, in one vessel.

4. Arranging the boiler to oscillate on its own base, without employing a separate device to support it, substantially as described.

ALFRED ARNOLD.

Witnesses:

HENRY STANTON,

HENRY B. STANTON.